E. Page,
Circular Saw Mill.
Nº 16,606.     Patented Feb. 10, 1857.
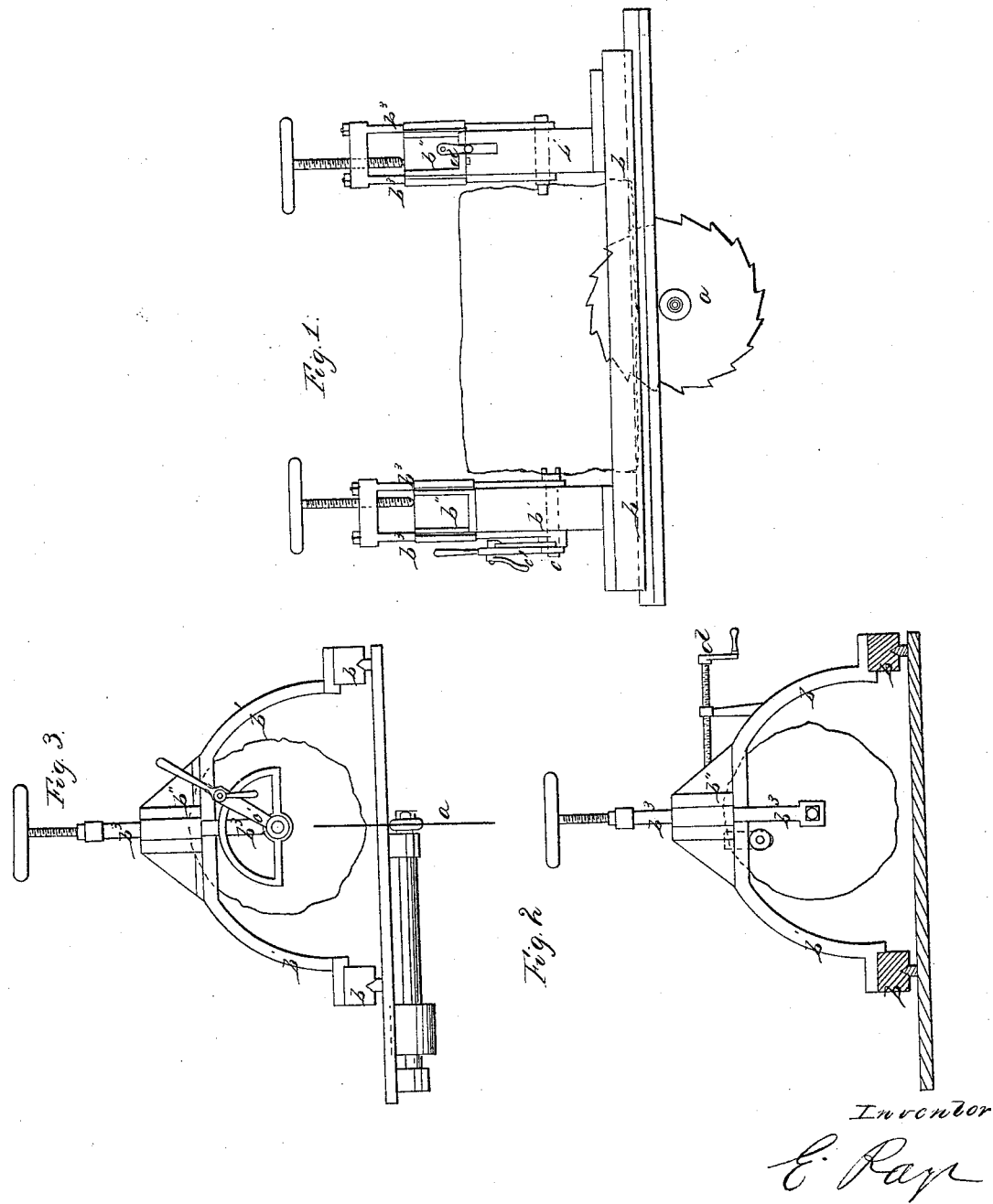
Inventor
E. Page

UNITED STATES PATENT OFFICE.

EZEKIEL PAGE, OF PLATEA, PENNSYLVANIA.

ARRANGEMENT OF DEVICES FOR SUSPENDING AND ADJUSTING STICKS IN SAWING-MACHINES.

Specification of Letters Patent No. 16,606, dated February 10, 1857.

*To all whom it may concern:*

Be it known that I, E. PAGE, of Platea, in the county of Erie and State of Pennsylvania, have invented certain new and useful Improvements in Machinery for Making Oars; and I do hereby declare the following to be a full, clear, and exact description thereof, reference being had to the accompanying drawing, in which—

Figure 1, is a side elevation; Fig. 2, a front view of the rail block; Fig. 3, same of head block or carriage.

Before my invention oars were generally split out of timber for if they were made of sawed stuff they came out the wrong way of the log so as to be liable to warp and split, and thus become useless. My improvements are for the purpose of sawing out the oars the right way of the log, to save timber and to make a more perfect article than has ever before been done by the use of the saw.

The device is constructed as follows. The saw is a common circular saw $a$ of any known pattern and driven in the usual way on each side of the saw are rails on which the carriage or carriages $b$ run. The carriage is composed of two side pieces either sliding or rolling on the rails. The side pieces $b$ are connected by an arched piece of metal $b'$ extending from one to the other and rising some distance above the saw. The center of this arched piece $b'$ is flat on the top and has a cap piece $b''$ bolted on to it. This cap piece has a box bolted to its two faces in which two metal bars $b^3$ slide vertically. A cross piece unites the bars $b^3$ at top through which a screw runs down to the cap piece by which the bars are raised and lowered. The lower ends of the bars have round holes through them which serve as the bearings of a horizontal mandrel or short shaft $c$ with a dog on its inner end by which the log to be sawed is fixed and with which it revolves. On the opposite end of this mandrel $c$ there is an arm or lever $c'$ for turning it and a clutch hook on it catches the segment of a circle made stationary to the bar $b^3$ by which the mandrel is firmly held in any position by screwing up the hook clutch. The height of the mandrel above the top of the saw is determined by the screw that elevates the bars $b^3$. The one end of the log to be sawed into oars is centered on the above mandrel $c$ and simply revolves when set at the proper elevation to be cut into the proper depth. The tail block is made in all particulars like the head block above described except in the following particulars: Instead of a revolving mandrel to turn with the log it has a simple center for the log to turn on and the cap instead of being bolted stationary to the arch is made to slide laterally by means of the horizontal screw $d$ seen at Fig. 3. By this arrangement the center on which the log is supported cannot only be raised and lowered as is the case with the head block but it can be shifted sidewise to any extent.

In order to make an oar that will not warp it is necessary to cut it radially from the log which is thus effected in the most economical manner. The log is properly set and a cut made; then it is turned a sufficient distance to cut the breadth of the handle or thickest part; next the tail block is shifted laterally so as to bring the cut angularly to the first and thus saw the thin blade of the oar; next the lox is turned sufficient for the thin part and the tail block run back which makes a taper in the other direction sawing out an oar in the opposite way; then the log is turned for a handle and so on till it is sawed entirely around. These are then split off and the process renewed by setting the log down.

I am aware that it has been attempted to saw clapboards by revolving a log on the center over a circular saw but this made straight parallel radial cuts and would not answer for oars and I am not aware that oars were ever sawed out radially from a log which is the only way to prevent warping and is a very important feature in their manufacture discovered by me.

Having thus fully described my improvements in the manufacture of oars, what I claim as my invention and desire to secure by Letters Patent is—

Constructing the head and tail blocks of a saw mill in which the log is so suspended as to rotate, with the vertical and lateral adjustments arranged and combined as set forth, so that the log may be sawed radially and tapering for the purpose of getting out oars therefrom as herein specified.

EZEKIEL PAGE.

Witnesses:
SANFORD SLATER,
T. WILLIAMS.